United States Patent
Fu et al.

(10) Patent No.: US 11,138,460 B2
(45) Date of Patent: Oct. 5, 2021

(54) IMAGE PROCESSING METHOD AND APPARATUS

(71) Applicant: HUAWEI TECHNOLOGIES CO., LTD., Guangdong (CN)

(72) Inventors: Jiali Fu, Shenzhen (CN); Qingpeng Xie, Shenzhen (CN); Yi Song, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 97 days.

(21) Appl. No.: 16/383,022

(22) Filed: Apr. 12, 2019

(65) Prior Publication Data

US 2019/0236400 A1 Aug. 1, 2019

Related U.S. Application Data

(63) Continuation of application No. PCT/CN2017/105090, filed on Sep. 30, 2017.

(30) Foreign Application Priority Data

Oct. 13, 2016 (CN) .......................... 201610896459.3

(51) Int. Cl.
- *G06K 9/62* (2006.01)
- *G06T 3/40* (2006.01)
- *G06T 3/00* (2006.01)

(52) U.S. Cl.
CPC .......... *G06K 9/6202* (2013.01); *G06T 3/0062* (2013.01); *G06T 3/4038* (2013.01)

(58) Field of Classification Search
None
See application file for complete search history.

(56) References Cited

U.S. PATENT DOCUMENTS

| 4,754,492 A | 6/1988 | Malvar |
| 5,657,073 A | 8/1997 | Henley |

(Continued)

FOREIGN PATENT DOCUMENTS

| CN | 1209934 A | 3/1999 |
| CN | 201523430 U | 7/2010 |

(Continued)

OTHER PUBLICATIONS

ISO/IEC 14496-12 Fifth edition, Information technology—Coding of audiovisual objects—Part 12: ISO base media file format, Dec. 15, 2015, total 248 pages.

(Continued)

*Primary Examiner* — Michelle M Entezari
(74) *Attorney, Agent, or Firm* — Womble Bond Dickinson (US) LLP

(57) ABSTRACT

An image processing method and apparatus. The image processing method includes: obtaining encoded data of a first region and a neighboring region neighboring to the first region in a two-dimensional planar image, where the two-dimensional planar image is an image obtained by mapping a spherical panorama image, and the first region and the neighboring region have an overlapping region; determining a pixel value of a pixel in an image of the first region; determining a pixel value of a pixel in an image of the neighboring region; and determining a target pixel value of a pixel in the overlapping region based on the pixel value of the pixel of the first region in the overlapping region and the pixel value of the pixel of the neighboring region in the overlapping region.

16 Claims, 8 Drawing Sheets

(56) References Cited

U.S. PATENT DOCUMENTS

| | | | |
|---|---|---|---|
| 6,057,847 A * | 5/2000 | Jenkins | G06T 15/20 |
| | | | 345/422 |
| 6,111,582 A * | 8/2000 | Jenkins | G06T 15/40 |
| | | | 345/421 |
| 7,277,118 B2 | 10/2007 | Foote | |
| 7,483,590 B2 | 1/2009 | Nielsen et al. | |
| 10,306,186 B2 * | 5/2019 | Chuang | H04N 5/247 |
| 2001/0033695 A1 | 10/2001 | Okuno et al. | |
| 2001/0045986 A1 | 11/2001 | Edwards | |
| 2007/0132863 A1 * | 6/2007 | Deguchi | H04N 5/2628 |
| | | | 348/239 |
| 2007/0200926 A1 | 8/2007 | Chianglin | |
| 2008/0074500 A1 | 3/2008 | Chen et al. | |
| 2014/0152658 A1 | 6/2014 | Ahn et al. | |
| 2015/0117524 A1 * | 4/2015 | Rondao Alface | H04N 19/46 |
| | | | 375/240.08 |
| 2015/0271453 A1 | 9/2015 | Chuang et al. | |
| 2017/0026659 A1 * | 1/2017 | Lin | H04N 19/426 |
| 2017/0038576 A1 * | 2/2017 | Sasaki | H04N 5/23238 |
| 2017/0223368 A1 * | 8/2017 | Abbas | H04N 19/59 |
| 2017/0294000 A1 * | 10/2017 | Shen | G06F 3/0482 |
| 2018/0324355 A1 | 11/2018 | Wang | |

FOREIGN PATENT DOCUMENTS

| | | | |
|---|---|---|---|
| CN | 101895693 A | 11/2010 | |
| CN | 102013110 A | 4/2011 | |
| CN | 102903090 A | 1/2013 | |
| CN | 103227914 A | 7/2013 | |
| CN | 103379291 A | 10/2013 | |
| CN | 105678693 A | 6/2016 | |
| CN | 105791882 A | 7/2016 | |
| CN | 106023074 A | 10/2016 | |
| WO | 95/15530 A1 | 6/1995 | |

OTHER PUBLICATIONS

ISO/IEC 13818-1 Second edition, Information technology—Generic coding of moving pictures and associated audio information: Systems, Dec. 1, 2000, total 174 pages.

Baoseng Song, Panorama Image Mosaicing Research and Implementation, Harbin Engineering University, CNKI, 2013. With English abstract. Total 134 pages.

S. Jumisko-Pyykk et al., Acceptance Threshold: A Bidimensional Research Method for User-Oriented Quality Evaluation Studies. International Journal of Digital Multimedia Broadcasting, vol. 2008, Mar. 5, 2008, 21 pages.

Tian Jun et al. The Projection Models and Algorithms of Panorama, Software Technique Algorithm, 2013. pp. 126-192, with English abstract.

Sang Hwa Lee et al. A mobile spherical mosaic system, ICIP 2013, pp. 1306-1310.

\* cited by examiner

IMAGE PROCESSING METHOD AND APPARATUS

CROSS-REFERENCE TO RELATED APPLICATIONS

This application is a continuation of International Application No. PCT/CN2017/105090, filed on Sep. 30, 2017, which claims priority to Chinese Patent Application No. 201610896459.3, filed on Oct. 13, 2016. The disclosures of the aforementioned applications are hereby incorporated by reference in their entireties.

TECHNICAL FIELD

This application relates to the field of image processing, and more specifically, to an image processing apparatus.

BACKGROUND

As it is inconvenient to store and represent a spherical panorama image, the spherical panorama image usually should be converted into a two-dimensional planar image before being processed, for example, being encoded. In the prior art, when a two-dimensional planar image is encoded, the two-dimensional planar image is divided into a plurality of mutually independent regions, then images of these regions are encoded to obtain encoded data, and finally the encoded data is stored or transmitted to a decoder side.

When receiving the encoded data, the decoder side may obtain pixel values of pixels in a plurality of regions in the two-dimensional planar image through decoding, and display the two-dimensional planar image on a terminal. If images of a first region and a second region that are neighboring in the two-dimensional planar image have different quality, when an image displayed on the terminal is switched from the image of the first region to the image of the second region, a user easily perceives a difference between the image of the first region and the image of the second region. An image displaying effect is poor, and user experience is affected.

SUMMARY

This application provides an image processing method and apparatus, to improve an image displaying effect.

According to one embodiment, an image processing method is provided. The method includes: obtaining encoded data of a first region and a neighboring region neighboring to the first region in a two-dimensional planar image, where the two-dimensional planar image is an image obtained by mapping a spherical panorama image, and the first region and the neighboring region have an overlapping region; determining a pixel value of a pixel in an image of the first region based on the encoded data of the image of the first region; determining a pixel value of a pixel in an image of the neighboring region based on the encoded data of the image of the neighboring region; and determining a target pixel value of a pixel in the overlapping region based on the pixel value of the pixel of the first region in the overlapping region and the pixel value of the pixel of the neighboring region in the overlapping region.

A final pixel value of an overlapping region is determined based on pixel values of pixels of different regions in the overlapping region, so that the pixel values relatively slowly change when neighboring regions transit to each other, thereby improving a displaying effect achieved when images corresponding to the neighboring regions are switched, and improving user experience.

In one embodiment before the obtaining encoded data of a plurality of regions in a two-dimensional planar image, the method further includes: sending first indication information to an encoder side, where the first indication information is used to indicate that the first region and the neighboring region that are obtained when the encoder side divides the two-dimensional planar image into regions have the overlapping region. When the foregoing method is performed by a decoder side device, the decoder side may determine how to divide a two-dimensional planar image into a plurality of regions, and notify the encoder side of region division information, in other words, the decoder side may also determine a region division manner. This is more flexible for image processing.

In one embodiment, the first indication information is further used to indicate a size of the overlapping region and a position of the overlapping region relative to the first region.

Therefore, the encoder side can not only determine, based on the first indication information, how to divide the two-dimensional planar image into the plurality of regions, and but also determine the size and position of the overlapping region, thereby facilitating image processing performed by the encoder side on the image.

In one embodiment, the method further includes: receiving second indication information from an encoder side, where the second indication information is used to indicate that the first region and the neighboring region have the overlapping region.

In one embodiment the determining a target pixel value of a pixel in the overlapping region based on the pixel value of the pixel of the first region in the overlapping region and the pixel value of the pixel of the neighboring region in the overlapping region includes: performing weighted processing on the pixel value of the pixel of the first region in the overlapping region and the pixel value of the pixel of the neighboring region in the overlapping region, to obtain the target pixel value of the pixel in the overlapping region.

A final pixel value of a pixel in an overlapping region is determined based on pixel values of pixels of neighboring regions in the overlapping region, so that the pixel value of the pixel in the overlapping region can smoothly transit between the neighboring regions, thereby improving an image displaying effect.

In one embodiment, the method further includes: the determining a target pixel value of a pixel in the overlapping region based on the pixel value of the pixel of the first region in the overlapping region and the pixel value of the pixel of the neighboring region in the overlapping region includes: when a first difference is less than a first preset threshold, determining the pixel value of the pixel of the first region or the neighboring region in the overlapping region as the target pixel value, where the first difference is a difference between a resolution of the image of the first region and a resolution of the image of the neighboring region or a difference between a bitrate of the encoded data of the first region and a bitrate of the encoded data of the neighboring region.

When resolutions of images of neighboring regions are relatively close, a pixel value of a pixel in an overlapping region may be directly determined, thereby improving image processing efficiency.

In one embodiment, the overlapping region is located between the first region and the neighboring region, and the first region is located in a horizontal direction of the neighboring region, or the first region is located in a vertical direction of the neighboring region.

In one embodiment, the size of the overlapping region is determined based on a size of the two-dimensional planar image.

In one embodiment, the size of the overlapping region is determined based on a size of the first region or the neighboring region.

In one embodiment, the two-dimensional planar image further includes a second region; the first region is located in the second region; the overlapping region is a region in the second region other than the first region; the second region is a region that is in the two-dimensional planar image and to which an image of a third region in the spherical panorama image is mapped; and the third region is a region that is in the spherical panorama image and in which an image corresponding to a first viewport range is located.

In one embodiment, the first viewport range is an angle value, and the angle value is a divisor of 360 degrees.

In one embodiment, an image processing method is provided. The method includes: dividing a two-dimensional planar image into a plurality of regions, where the plurality of regions include a first region and a neighboring region neighboring to the first region, the first region and the neighboring region have an overlapping region, and the two-dimensional planar image is an image obtained by mapping a spherical panorama image; encoding an image of the first region to obtain encoded data of the first region; and encoding an image of the neighboring region to obtain encoded data of the neighboring region.

During region division, the two-dimensional planar image is divided into images of which neighboring regions have an overlapping region. Compared with the prior art that regions obtained through division have no overlapping region, a decoder side can determine a final pixel value of the overlapping region based on pixel values of pixels of the neighboring regions in the overlapping region, so that the pixel values relatively slowly change when the neighboring regions transit to each other, thereby improving a displaying effect achieved when images corresponding to the neighboring regions are switched, and improving user experience.

In one embodiment, before the dividing a two-dimensional planar image into a plurality of regions, the method further includes: receiving first indication information from a decoder side, where the first indication information is used to indicate that the first region and the neighboring region that are obtained when the two-dimensional planar image is divided into regions have the overlapping region.

In one embodiment, the first indication information is further used to indicate a size of the overlapping region and a position of the overlapping region relative to the first region.

In one embodiment, the method further includes: sending second indication information to the decoder side, where the second indication information is used to indicate that the first region and the neighboring region have the overlapping region.

In one embodiment, the overlapping region is located between the first region and the neighboring region, and the first region is located in a horizontal direction of the neighboring region, or the first region is located in a vertical direction of the neighboring region.

In one embodiment, the size of the overlapping region is determined based on a size of the two-dimensional planar image.

In one embodiment, the size of the overlapping region is determined based on a size of the first region or the neighboring region.

In one embodiment, the two-dimensional planar image further includes a second region; the first region is located in the second region; the overlapping region is a region in the second region other than the first region; the second region is a region that is in the two-dimensional planar image and to which an image of a third region in the spherical panorama image is mapped; and the third region is a region that is in the spherical panorama image and in which an image corresponding to a first viewport range is located.

In one embodiment, the first viewport range is an angle value, and the angle value is a divisor of 360 degrees.

In one embodiment, an image processing apparatus is provided. The image processing apparatus includes modules configured to perform the method according to the one or more of the embodiments described herein.

In one embodiment, an image processing apparatus is provided. The image processing apparatus includes modules configured to perform the method according to one or more of the embodiments described herein.

In one embodiment, an image processing apparatus is provided. The image processing apparatus includes a memory and a processor, the memory is configured to store a program, the processor is configured to execute the program, and when the program is executed, the processor is configured to perform the method according to one or more of the embodiments described herein.

In one embodiment, an image processing apparatus is provided. The image processing apparatus includes a memory and a processor, the memory is configured to store a program, the processor is configured to execute the program, and when the program is executed, the processor is configured to perform the method according to one or more of the embodiments described herein.

In one embodiment, a computer-readable medium is provided. The computer-readable medium stores program code to be executed by a device, and the program code includes an instruction used to perform the method according to one or more of the embodiments described herein.

In one embodiment, a computer-readable medium is provided. The computer-readable medium stores program code to be executed by a device, and the program code includes an instruction used to perform the method according to one or more of the embodiments described herein.

In one embodiment, the plurality of regions further include other regions, and the other regions have the overlapping region.

In one embodiment, any two neighboring regions in the plurality of regions have the overlapping region.

In one embodiment, the first region and the neighboring region have a same size.

In one embodiment, the method further includes: determining a second difference between a bitrate corresponding to the image of the first region and a bitrate corresponding to the image of the neighboring region; and the determining a target pixel value of a pixel in the overlapping region based on the pixel value of the pixel in the image of the first region in the overlapping region and the pixel value of the pixel in the image of the neighboring region in the overlapping region includes:

when the second difference is less than a second preset threshold, determining the pixel value of the pixel in the image of the first region or the neighboring region in the overlapping region as the target pixel value of the pixel in the overlapping region.

In one embodiment, the size of the overlapping region is fixed. That is, the size of the overlapping region may be a fixed region size determined before encoding and decoding.

In one embodiment, any of the plurality of regions may be square, rectangular, round, trapezoid, or arc-shaped. It should be understood that any of the plurality of regions may alternatively have another irregular shape.

In one embodiment, the two-dimensional planar image is a 2D longitude and latitude map.

DESCRIPTION OF EMBODIMENTS

The following describes technical solutions of this application with reference to accompanying drawings.

To better understand an image processing method and an image processing method in embodiments of this application, content related to video encoding and decoding in the prior art is briefly described first with reference to FIG. 1 to FIG. 4.

Figure 1:
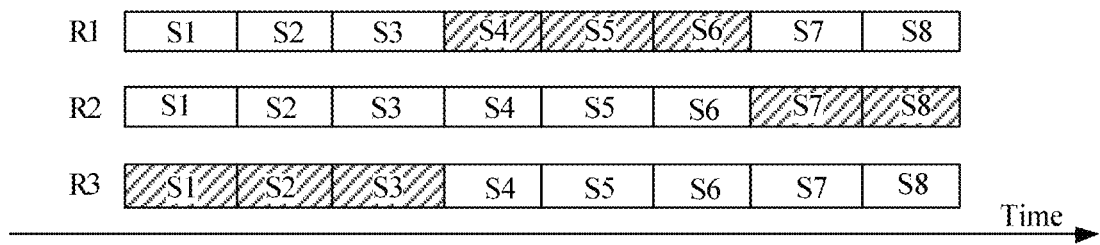
FIG. 1 is a schematic diagram of bitstreams corresponding to a video file.

When an image is encoded, usually different versions of bitstreams are made, and the bitstreams are referred to as a media representation (representation). Encoding parameters such as bitrates and resolutions of different media representations are usually different. Each media representation may be segmented into a plurality of small files, and the small files are usually referred to as segments (segment). As shown in FIG. 1, after encoding a video file, an encoding device obtains three media representations R1, R2, and R3. R1 is a high-definition video whose bitrate is 4 MBPS (megabit per second), R2 is a standard-definition video whose bitrate is 2 MBPS, and R3 is a standard-definition video whose bitrate is 1 MBPS. Each media representation includes eight segments. The segments of each media representation may be successively stored in a file, or separately stored in different files. During playback of the video, a user may select any media representation for playback. For example, if the user selects R1, the 4-MBPS high-definition video is played, or if the user selects R2, a 2-MBPS standard-definition video is played (apparently, a playback effect of the selected R1 is better than a playback effect of the selected R2). In addition, the user may alternatively select some segments of R1, R2, and R3 for playback. As shown in FIG. 1, shaded parts are segments requested by a client for playback. When the video file is played, the first three segments of R3 are first played, then the fourth to the sixth segments of R1 are played, and finally, the seventh and the eighth segments of R2 are played. In other words, the user first requests to play a 1-MBPS standard-definition video, then requests to play a 4-MBPS high-definition video, and finally, requests to play a 2-MBPS standard-definition video. When the played video is switched between different resolutions, the user can easily perceive changes of video quality due to a relatively large difference between video quality. In addition, if the user is currently focusing on an image of a region and video quality suddenly changes greatly, subjective experience of the user is severely affected.

Figure 2:
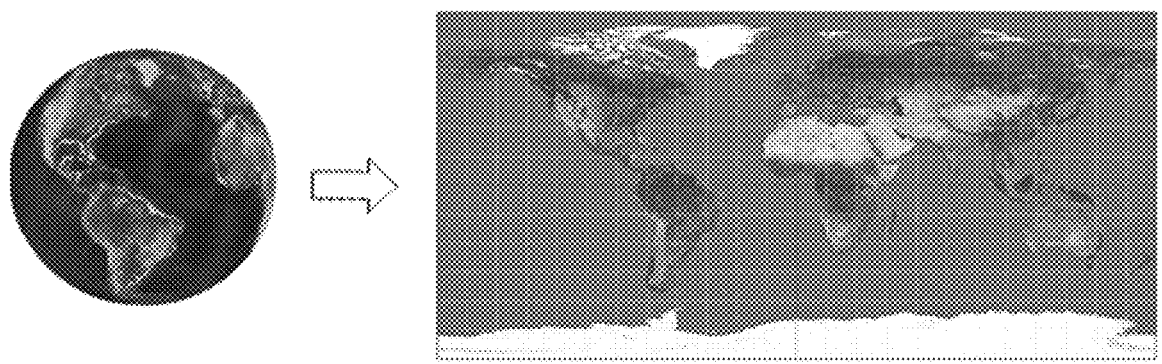
FIG. 2 is a schematic diagram of mapping a spherical panorama image to a longitude and latitude map.

With the rise of virtual reality (Virtual Reality, VR) devices, spherical panorama images start to emerge. A spherical panorama image is a 360-degree spherical image, and it exceeds a normal visual range of human eyes. In a process of encoding the spherical panorama image, usually, a panorama image is first converted into a two-dimensional planar image (where the two-dimensional planar image is commonly in a form of a longitude and latitude map), and then other processing is performed on the two-dimensional planar image. As shown in FIG. 2, at the left side of FIG. 2, there is a spherical panorama image, and a longitude and latitude map at the right side of FIG. 2 may be obtained by mapping the spherical panorama image. A specific process of converting a spherical panorama image into a 2D longitude and latitude map is: For any point P on a spherical image, during image mapping, a longitude coordinate of the point P is mapped to a horizontal coordinate of a rectangle, and a latitude coordinate of the point P is mapped to a vertical coordinate of the rectangle. In the same way, other points on the spherical image are mapped to a rectangular region, and a 2:1 2D longitude and latitude map is obtained.

Figures 3, 4:
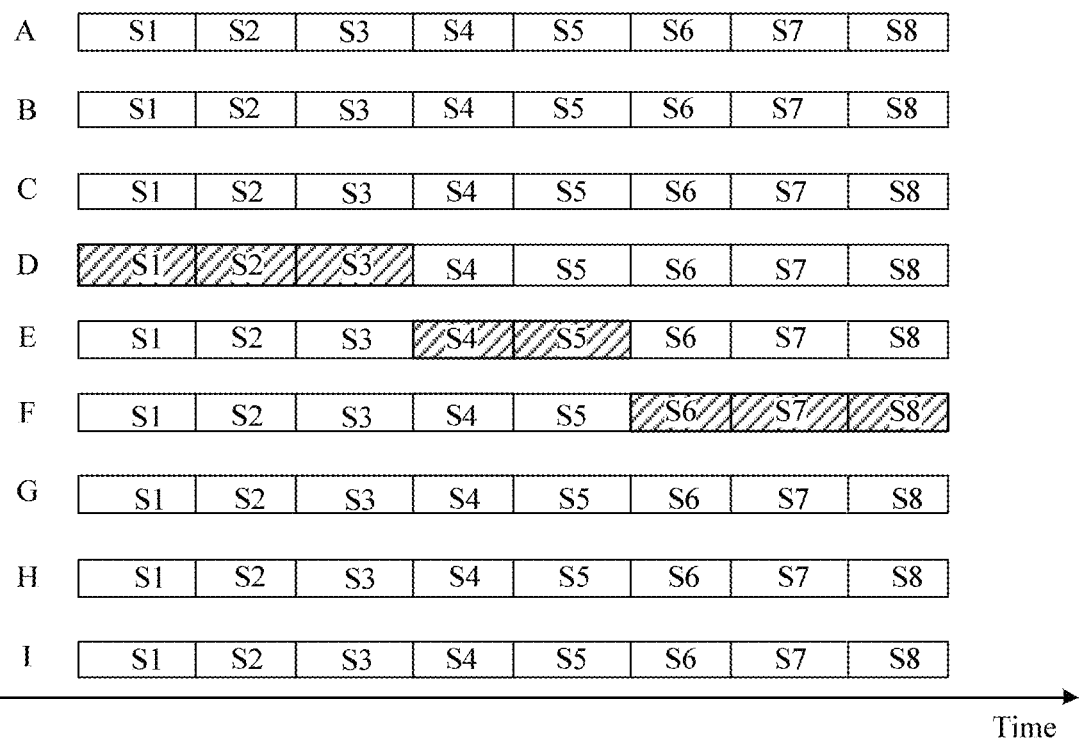
FIG. 3 is a schematic diagram of subregions in a two-dimensional planar image.
FIG. 4 is a schematic diagram of encoded data corresponding to different subregions in a two-dimensional planar image.

During encoding of a longitude and latitude map, the longitude and latitude map is usually divided into n independent regions, and then an image of each region is separately encoded. Different regions may be encoded in different manners. The longitude and latitude map in FIG. 2 may be divided into nine independent regions (A, B, C, D, E, F, G, H, and I) shown in FIG. 3, and then, the nine regions are separately encoded to obtain media representations of the nine regions, as shown in FIG. 4.

When a terminal plays the spherical panorama image shown in FIG. 2, images of different regions may correspond to different viewports. For example, when a viewport of the user changes, an image that the user views is switched from an image displayed in the region D to an image displayed in the region E, and then switched to an image displayed in the region F. As shown in FIG. 4, the user views images corresponding to the first three segments (S1, S2, and S3) of the region D, images corresponding to the fourth and the fifth segments (S4 and S5) of the region E, and images corresponding to the sixth to the eighth segments (S6, S7, and S8) of the region F. If bitstreams of S3 in the region D and S4 in the region E are different, or resolutions of the image corresponding to S3 in the region D and the image corresponding to S4 in the region E are different, when the user views that the image corresponding to the region D is switched to the image corresponding to the region E, the user easily perceives a difference between the images corresponding to the two regions. In addition, when the user is currently focusing on an image at a boundary of the region D and the region E, user experience is severely affected. Similarly, if bitstreams of S5 in the region E and S6 in the region F are different, or resolutions of the image corresponding to S5 in the region D and the image corresponding to S6 in the region F are different, when the user views that the image corresponding to the region E is switched to the image corresponding to the region F, the user easily perceives a difference between the images.

Therefore, an embodiment of this application provides an image encoding method. When a two-dimensional planar image is encoded, the two-dimensional planar image is divided into a plurality of regions in which neighboring regions include an overlapping region, and then images of the plurality of regions are separately encoded to obtain encoded data, where when images of different regions are encoded, different encoding manners and encoding parameters may be used. After decoding the encoded data, a decoder side may obtain pixel values of pixels in the images of the plurality of regions in the two-dimensional planar image, and then determine a final pixel value of a pixel in the overlapping region based on the pixel values of the pixels in the plurality of regions. That is, when the pixel value of the pixel in the overlapping region is determined, the pixel values of the pixels in the neighboring regions are comprehensively considered. Therefore, during image playback, images corresponding to the neighboring regions are more smoothly switched, thereby improving a displaying effect.

The following describes the image processing method in this embodiment of this application in detail with reference to FIG. 5 to FIG. 13.

Figure 5:
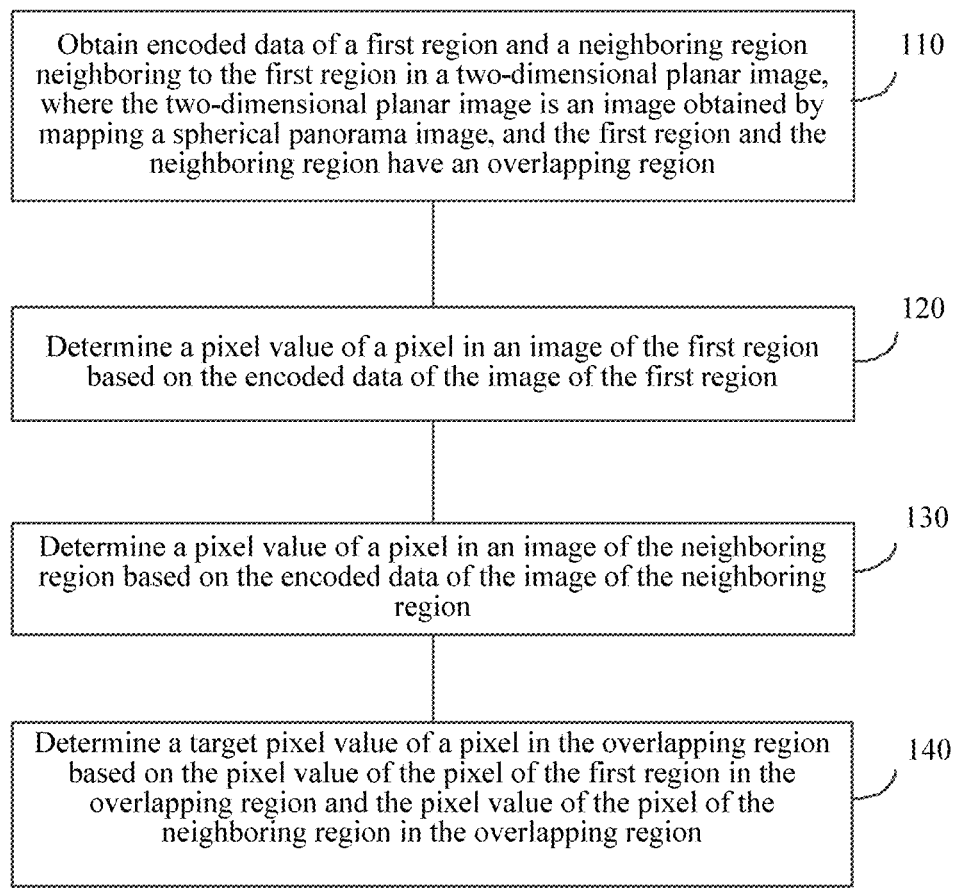
FIG. 5 is a schematic flowchart of an image processing method according to an embodiment of this application.

FIG. 5 is a schematic flowchart of an image processing method according to an embodiment of this application. The image processing method shown in FIG. 5 may be performed by a decoder side device, and the image processing method includes the following blocks or operations.

110. Obtain encoded data of a first region and a neighboring region neighboring to the first region in a two-dimensional planar image, where the two-dimensional planar image is an image obtained by mapping a spherical panorama image, and the first region and the neighboring region have an overlapping region.

The two-dimensional planar image may be the longitude and latitude map shown in FIG. 2, or may be a two-dimensional planar image obtained by mapping a spherical panorama image to a polyhedron. For example, the two-dimensional planar image may be an image obtained by mapping a spherical panorama image to a regular hexahedron and then unfolding the regular hexahedron.

When the image processing method is performed by the decoder side device, the decoder side device may obtain encoded data of the two-dimensional planar image from an encoder side, cloud, or another storage device.

120. Determine a pixel value of a pixel in an image of the first region based on the encoded data of the image of the first region.

130. Determine a pixel value of a pixel in an image of the neighboring region based on the encoded data of the image of the neighboring region.

The first region and the neighboring region of the first region may be any two neighboring regions in the plurality of regions in the foregoing two-dimensional image. It should be understood that, the plurality of regions may further include other regions, and the regions may also have an overlapping region.

Preferably, the plurality of regions are N regions, and any two neighboring regions in the N regions have an overlapping region.

An overlapping region is set between neighboring regions, so that when an image displayed on a terminal is switched from an image corresponding to a region to an image corresponding to another neighboring region, transition is relatively natural, and user experience is improved.

140. Determine a target pixel value of a pixel in the overlapping region based on the pixel value of the pixel of the first region in the overlapping region and the pixel value of the pixel of the neighboring region in the overlapping region.

Figure 6:
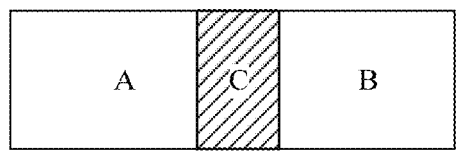
FIG. 6 is a schematic diagram of a first region and a neighboring region in a two-dimensional planar image.

For example, as shown in FIG. 6, a region A is the first region, a region B is the neighboring region of the first region, and both the region A and the region B include a region C. In other words, the region C is an overlapping region of the region A and the region B. It is assumed that the region C has 100 pixels in total. Pixel values that are of the 100 pixels in the region C and that are obtained when the region A is decoded are first-type pixel values, and pixel values that are of the 100 pixels in the region C and that are obtained when the region B is decoded are second-type pixel values. If the encoder side encodes images in the region A and the region B in different manners, as a result, the first-type pixel values and the second-type pixel values obtained after the decoder side performs decoding may probably be different. In this case, the decoder side may determine a target pixel value of the 100 pixels in the region C based on the first-type pixel values and the second-type pixel values. For example, smooth filtering processing is performed on the first-type pixel values and the second-type pixel values, so that the target pixel value of the 100 pixels in the region C is between the first-type pixel values and the second-type pixel values. In this way, when the image displayed on the terminal is switched from the image of the first region to the image of the neighboring region, smooth transition can be implemented, and an image displaying effect during playback can be improved, thereby improving user experience.

The decoder side device above may be a terminal device, or may be a device specially used for decoding. When the decoder side device is a terminal device, the decoder side device may directly display an image after decoding. When the decoder side device is a device specially used for decoding, after completing decoding, the decoder side device may store decoded information or transmit decoded information to the terminal.

In this embodiment of this application, a final pixel value of an overlapping region is determined based on pixel values of pixels of different regions in the overlapping region, so that the pixel values relatively slowly change when neighboring regions transit to each other, thereby improving a displaying effect achieved when images corresponding to the neighboring regions are switched, and improving user experience.

Optionally, in an embodiment, before the obtaining the encoded data of a plurality of regions in a two-dimensional planar image, the image processing method in this embodiment of this application further includes:

sending first indication information to an encoder side, where the first indication information is used to indicate that the first region and the neighboring region that are obtained when the encoder side divides the two-dimensional planar image into regions have the overlapping region.

That is, the decoder side may first determine a division manner of dividing the two-dimensional planar image into regions. The dividing manner includes: dividing the two-dimensional planar image into a plurality of regions, of which regions have an overlapping region. Then, the decoder side sends the first indication information to the encoder side, so that the encoder side divides the two-dimensional planar image in the division manner determined by the decoder side.

Optionally, the first indication information is further used to indicate a size of the overlapping region and a position of the overlapping region relative to the first region. That is, the first indication information not only indicates regions that are in the two-dimensional planar image and that have an overlapping region, but also indicates the size or the position of the overlapping region.

It should be understood that, the encoder side may divide the two-dimensional planar image into a plurality of regions as indicated by the decoder side, and may independently determine how to divide the two-dimensional planar image into a plurality of regions.

Optionally, in an embodiment, the method in this embodiment of this application further includes:

receiving second indication information sent by an encoder side, where the second indication information is used to indicate that the first region and the neighboring region have the overlapping region.

The decoder side determines, based on the second indication information, that the first region and the neighboring region have the overlapping region.

Optionally, in an embodiment, the determining a target pixel value of a pixel in the overlapping region based on the pixel value of the pixel of the first region in the overlapping region and the pixel value of the pixel of the neighboring region in the overlapping region includes: performing weighted processing on the pixel value of the pixel of the first region in the overlapping region and the pixel value of the pixel of the neighboring region in the overlapping region, to obtain the target pixel value of the pixel in the overlapping region.

For example, there are nine pixels in total in the overlapping region of the first region and the neighboring region (for ease of description, only nine pixels are used as an example herein for description, but actually, there are far more than nine pixels in the overlapping region). Pixel values that are of the nine pixels of the first region in the overlapping region and that are obtained after the encoded data corresponding to the first region is decoded are respectively 100, 100, 100, 110, 120, 110, 100, 120, 120. Pixel values that are of the nine pixels of the neighboring regions in the overlapping region and that are obtained after the encoded data corresponding to the neighboring region is decoded are respectively 90, 90, 90, 90, 90, 90, 100, 100, 100. Smooth processing is performed on the pixel values of the pixels in the first region and the pixel values of the pixels in the neighboring region, and final pixel values of the nine pixels in the overlapping region are obtained, and are respectively (100+90)/2, (100+90)/2, (100+90)/2, (110+90)/2, (120+90)/2, (110+90)/2, (100+100)/2, (100+120)/2, and (100+100)/2.

Optionally, in an embodiment, the image processing method in this embodiment of this application further includes:

the determining a target pixel value of a pixel in the overlapping region based on the pixel value of the pixel of the first region in the overlapping region and the pixel value of the pixel of the neighboring region in the overlapping region includes:

when a first difference is less than a first preset threshold, determining the pixel value of the pixel of the first region or the neighboring region in the overlapping region as the target pixel value, where the first difference is a difference between a resolution of the image of the first region and a resolution of the image of the neighboring region or a difference between a bitrate of the encoded data of the first region and a bitrate of the encoded data of the neighboring region.

It should be understood that, before the determining the pixel value of the pixel of the first region or the neighboring region in the overlapping region as the target pixel value, the method in this embodiment of this application further includes: determining the first difference between the resolution of the image of the first region and the resolution of the image of the neighboring region.

When the resolution of the image of the first region is relatively close to the resolution of the image of the neighboring region, the pixel value of the pixel of the first region in the overlapping region is also usually close to the pixel value of the pixel of the neighboring region in the overlapping region. In this case, using the pixel value of the first region or the neighboring region in the overlapping region as the pixel value of the pixel in the overlapping region can improve decoding efficiency.

Optionally, the image processing method in this embodiment of this application further includes:

determining a second difference between a bitrate corresponding to the image of the first region and a bitrate corresponding to the image of the neighboring region; and the determining a target pixel value of a pixel in the overlapping region based on the pixel value of the pixel of the first region in the overlapping region and the pixel value of the pixel of the neighboring region in the overlapping region includes: when the second difference is less than a second preset threshold, determining the pixel value of the pixel of the first region or the neighboring region in the overlapping region as the target pixel value of the pixel in the overlapping region.

In addition to obtaining, through comparison, the difference between the resolution of the image of the first region and the resolution of the image of the neighboring region, the difference between the bitrate corresponding to the image of the first region and the bitrate corresponding to the image of the neighboring region may also be obtained through comparison. When the difference between the resolutions or the difference between the bitrates is relatively small, the pixel value of the pixel of the first region or the neighboring region in the overlapping region may be directly determined as the final pixel value of the pixel in the overlapping region.

Optionally, the overlapping region is located between the first region and the neighboring region, and the first region is located in a horizontal direction of the neighboring region, or the first region is located in a vertical direction of the neighboring region. It should be understood that, the first region may alternatively be located in a direction having an angle with the neighboring region.

Figure 7:
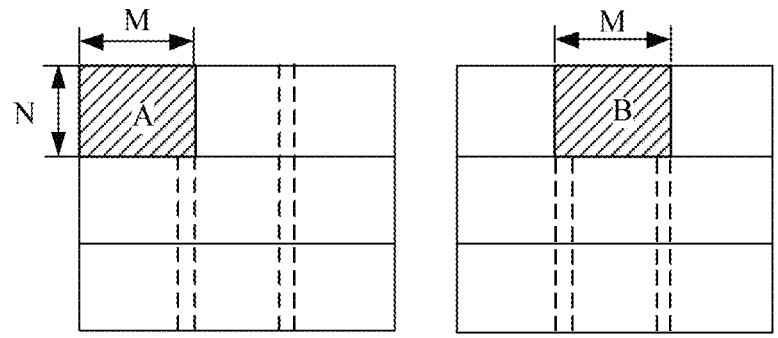
FIG. 7 is a schematic diagram of a first region and a neighboring region in a two-dimensional planar image.
Figure 8:
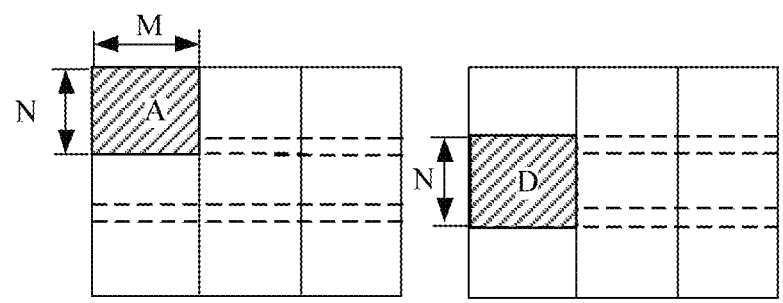
FIG. 8 is a schematic diagram of a first region and a neighboring region in a two-dimensional planar image.
Figure 9:
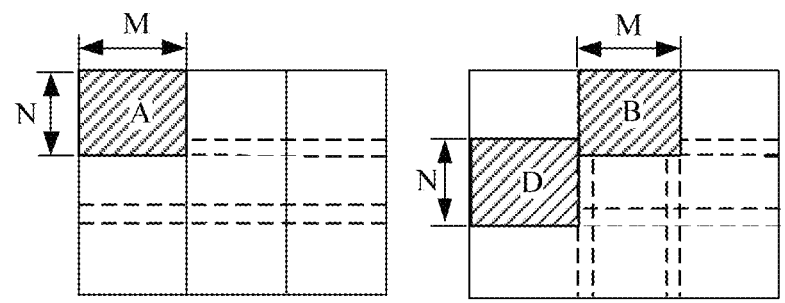
FIG. 9 is a schematic diagram of a first region and a neighboring region in a two-dimensional planar image.

The following describes the overlapping region of the first region and the neighboring region of the first region in detail with reference to FIG. 7 to FIG. 9.

In FIG. 7, a region A is the first region, a region B is the neighboring region, the region A and the region B are neighboring regions in a horizontal direction, and the region A and the region B form an overlapping region in the horizontal direction. In FIG. 8, a region A is the first region, a region D is the neighboring region, the region A and the region D are neighboring regions in a vertical direction, and the region A and the region D form an overlapping region in the vertical direction.

It should be understood that, in the two-dimensional planar image, a region and a neighboring region in the horizontal direction may form an overlapping region, or a region and a neighboring region in the vertical direction may form an overlapping region.

In FIG. 9, a region A is the first region, and a region B and a region D are neighboring regions of the region A. The region A and the region B form an overlapping region in the horizontal direction, and the region A and the region D form an overlapping region in the vertical direction.

Optionally, in an embodiment, a size of the overlapping region is preset. The size of the overlapping region may be preset by an encoder or a user. For example, the overlapping region may be set to a region having a size of K×L. K is 200 pixels and L is 100 pixels.

Optionally, in an embodiment, the size of the overlapping region is determined based on a size of the two-dimensional planar image.

The size of the overlapping region is positively correlated to the size of the two-dimensional planar image. A larger two-dimensional planar image indicates a larger overlapping region. During determining of the size of the overlapping region, the size of the overlapping region may be determined by multiplexing the two-dimensional planar image by a particular ratio. For example, the size of the two-dimensional planar image is X×Y (where there are X pixels in the horizontal direction, and Y pixels in the vertical direction), a size of each region in the two-dimensional planar image is M×N (where there are M pixels in the horizontal direction, and N pixels in the vertical direction), and the size of the overlapping region is K×L (where there are K pixels in the horizontal direction, and L pixels in the vertical direction). Therefore, when the overlapping region is a horizontal overlapping region, K=1/10*X, and L=N; or when the overlapping region is a vertical overlapping region, K=M, and L=1/9*Y.

Optionally, in an embodiment, the size of the overlapping region is determined based on a size of the first region or the neighboring region.

The size of the overlapping region is positively correlated to a size of a region obtained through division, and a larger region obtained through division indicates a larger overlapping region. During determining of the size of the overlapping region, the size of the overlapping region may be determined by multiplexing the two-dimensional planar image by a particular ratio. For example, the size of the first region or the neighboring region is M×N (where there are M pixels in the horizontal direction, and N pixels in the vertical direction). Therefore, when the overlapping region is a horizontal overlapping region, K=1/5*M, and L=N; or when the overlapping region is a vertical overlapping region, K=M, and L=1/4*N.

Optionally, in an embodiment, the size of the overlapping region is determined based on a viewport range of the spherical panorama image. That is, when the spherical panorama image is mapped to a planar image, how to divide a spherical panorama video image into regions, regions that have an overlapping region, and a size of the overlapping region may be determined based on a viewport range of a user in viewing the spherical panorama video image.

When the image is divided into regions, if neighboring regions have an overlapping region, a bitrate by using which the image is processed is increased by a particular amount. For example, the first region and the neighboring region have an overlapping region, and when the first region and the neighboring region are encoded, images in the overlapping region are repeatedly encoded. As a result, bitrates are increased, and the increase in the bitrates may affect an image playback effect.

Optionally, in an embodiment, the two-dimensional planar image further includes a second region; the first region is located in the second region; the overlapping region is a region in the second region other than the first region; the second region is a region that is in the two-dimensional planar image and to which an image of a third region in the spherical panorama image is mapped; and the third region is a region that is in the spherical panorama image and in which an image corresponding to a first viewport range is located.

The first region is mapped to a fourth region in the spherical panorama image. The third region is centered on a center of the fourth region and obtained based on a preset first viewport range.

Optionally, in an embodiment, the first viewport range is an angle value, and the angle value is a divisor of 360 degrees. For example, the angle value may be 60 degrees and 30 degrees.

Herein, the third region is determined first based on the first viewport, then the third region is mapped to the second region, and then the overlapping region of the first region is finally determined based on the second region and the first region.

Using FIG. 9 as an example, the two-dimensional planar image is divided into nine regions, and in the nine regions, each two neighboring regions have an overlapping region. By setting overlapping regions of different sizes, bitrates of the two-dimensional planar image in the different overlapping regions and changes of the bitrates along with the overlapping region of different sizes are obtained, as shown in Table 1.

TABLE 1

Relationships between a size and a bitrate of an overlapping region and a bitrate change

| | Overlapping area/image subregion | | | | |
|---|---|---|---|---|---|
| | 0 | 2% | 4% | 6% | 8% |
| bitrate (kbps) | 12073.29 | 12453.96 | 12670.2 | 12964.55 | 13098.43 |
| Increase rate of the bitrate | | 3.15% | 4.94% | 7.38% | 8.49% |

In Table 1, as a ratio of an overlapping region to an image subregion gradually increases (an area of the overlapping region gradually increases), an increase ratio of a bitrate of the two-dimensional planar image is not obvious. That is, according to this embodiment of this application, an image displaying effect can be improved and user experience can be improved if the bitrate corresponding to the two-dimensional planar image is not significantly increased.

The foregoing describes the image processing method in the embodiments of this application in detail from the perspective of the decoder side, and the following describes an entire procedure of the image processing method in the embodiments of this application in detail from the perspective of the decoder side. It should be understood that, an encoding process corresponds to a decoding process. For brevity, when the image processing method is described, content that already exists in the decoder side is properly omitted.

Figure 10:
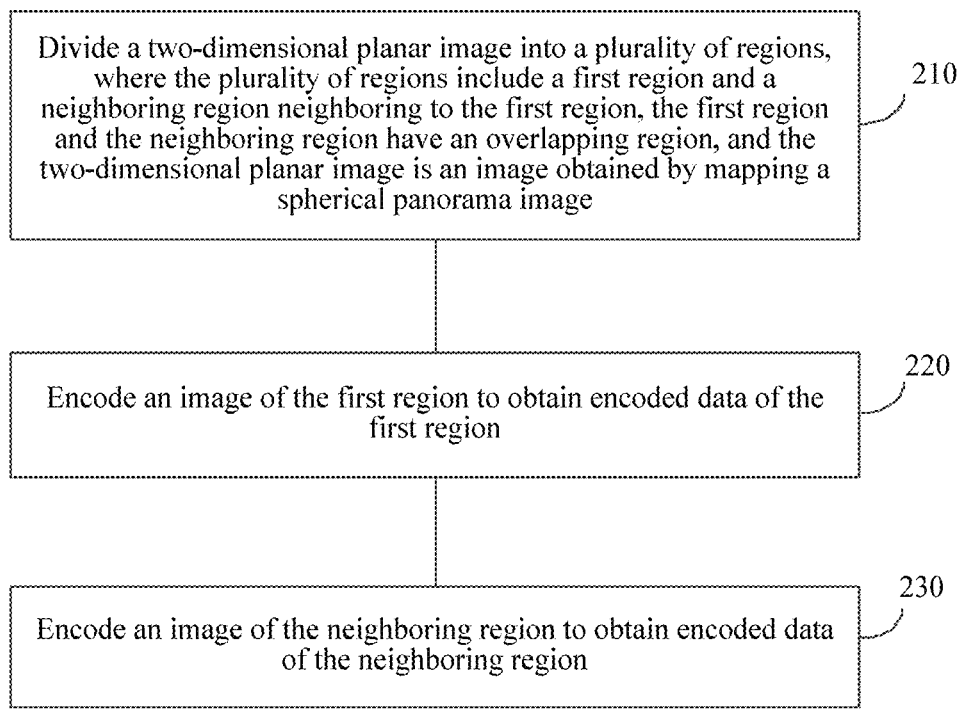
FIG. 10 is a schematic flowchart of an image processing method according to an embodiment of this application.

FIG. 10 is a schematic flowchart of an image processing method according to an embodiment of this application. The image processing method shown in FIG. 10 may be performed by an encoder side device, and the image processing method includes the following blocks or operations.

210. Divide a two-dimensional planar image into a plurality of regions, where the plurality of regions include a first region and a neighboring region neighboring to the first region, the first region and the neighboring region have an overlapping region, and the two-dimensional planar image is an image obtained by mapping a spherical panorama image.

220. Encode an image of the first region to obtain encoded data of the first region.

230. Encode an image of the neighboring region to obtain encoded data of the neighboring region.

It should be understood that, when the image processing method above is performed by an encoder side, the encoder side encodes images of other regions in the plurality of regions to finally obtain encoded data of images of all regions in the two-dimensional planar image, and stores the encoded data or sends the encoded data to a decoder side. After obtaining the encoded data, the decoder side may decode the encoded data. A specific decoding process is shown in the image processing method shown in FIG. 5, and is not repeatedly described herein.

In this embodiment of this application, during region division, the two-dimensional planar image is divided into images of which neighboring regions have an overlapping region. Compared with the prior art that regions obtained through division have no overlapping region, the decoder side can determine a final pixel value of the overlapping region based on pixel values of pixels of the neighboring regions in the overlapping region, so that the pixel values relatively slowly change when the neighboring regions transit to each other, thereby improving a displaying effect achieved when images corresponding to the neighboring regions are switched, and improving user experience.

Optionally, in an embodiment, the image processing method in this embodiment of this application further includes:

receiving first indication information from a decoder side, where the first indication information is used to indicate that the first region and the neighboring region that are obtained when the two-dimensional planar image is divided into regions have the overlapping region.

Optionally, the first indication information is further used to indicate a size of the overlapping region and a position of the overlapping region relative to the first region.

The first indication information is sent, so that it can be convenient for the decoder side to determine that the first region and the neighboring region of the first region in the plurality of regions in the two-dimensional image have the overlapping region.

Optionally, in an embodiment, the image processing method in this embodiment of this application further includes:

sending second indication information to the decoder side, where the second indication information is used to indicate that the first region and the neighboring region have the overlapping region.

Optionally, in an embodiment, the overlapping region is located between the first region and the neighboring region, and the first region is located in a horizontal direction of the neighboring region, or the first region is located in a vertical direction of the neighboring region. It should be understood that, the first region may alternatively be located in a direction having an angle with the neighboring region.

Optionally, in an embodiment, the size of the overlapping region is determined based on a size of the two-dimensional planar image.

Optionally, in an embodiment, the size of the overlapping region is determined based on a size of the first region or the neighboring region.

Optionally, in an embodiment, the two-dimensional planar image further includes a second region; the first region is located in the second region; the overlapping region is a region in the second region other than the first region; the second region is a region that is in the two-dimensional planar image and to which an image of a third region in the spherical panorama image is mapped; and the third region is a region that is in the spherical panorama image and in which an image corresponding to a first viewport range is located.

The first region is mapped to a fourth region in the spherical panorama image. The third region is centered on a center of the fourth region and obtained based on a preset first viewport range.

Optionally, in an embodiment, the first viewport range is an angle value, and the angle value is a divisor of 360 degrees.

Figure 11:
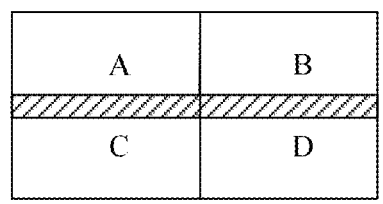
FIG. 11 is a schematic diagram of regions A, B, C, and D in a two-dimensional image.
Figure 12:
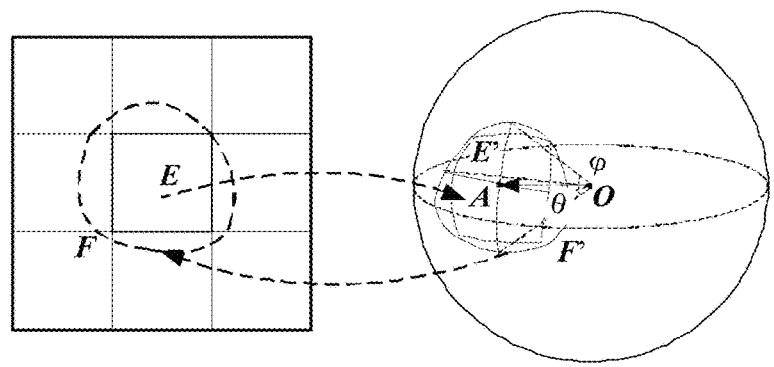
FIG. 12 is a schematic diagram of mapping a spherical panorama image to a planar image.

The foregoing describes the image processing method and the image processing method in the embodiments of this application in detail from the perspective of the decoder side and the encoder side, and the following describes the image processing method and the image processing method in the embodiments of this application in detail by using specific examples with reference to FIG. 11 and FIG. 12.

EXAMPLE 1

A specific process of decoding the two-dimensional planar image is as follows:

301. A decoder side decodes encoded data to obtain an image obtained through the decoding.

The decoder side may obtain a plurality of pieces of encoded data of the two-dimensional planar image from an encoder side or cloud, to decode the encoded data to generate a reconstructed image. The reconstructed image is a two-dimensional planar image including a plurality of regions. Decompression methods such as H.264 and H.265 may be used during decoding.

302. Process images of a plurality of regions.

When or before obtaining the encoded data, the decoder side obtains overlapping region information generated by the encoder side (where the overlapping information is used to indicate a quantity of regions into which the two-dimensional planar image is divided by the encoder side, regions that have an overlapping region, and a size, a position, and the like of the overlapping region). In this way, after decoding the images of the plurality of regions, the decoder side may determine a position and a size of an overlapping region of reconstructed images based on the overlapping information, and determine a final pixel value of a pixel in the overlapping region based on pixel values of pixels of different regions in the overlapping region.

For example, as shown in FIG. 12, the decoder side obtains, based on encoded data corresponding to regions A, B, C, and D in a two-dimensional planar image, reconstructed images of the regions, and determines, based on overlapping information, that the region A and the region C have an overlapping region and the region B and the region D have an overlapping region. In this case, the decoder side may determine a pixel value of a pixel in the overlapping region of the region A and the region C based on pixel values of pixels in the region A and the region C. Similarly, the decoder side may determine a pixel value of a pixel in the overlapping region of the region B and the region D by using a same method.

303. Splice, based on region positions, the images of the plurality of regions into a panorama image.

Using a two-dimensional planar image in FIG. 11 as an example, images of regions A, B, C, and D are spliced into a panorama image based on distribution positions of the images of the regions.

304. Display the panorama image obtained in block 303 on a terminal device, or convert the panorama image into a spherical image and display the spherical image on a terminal device.

EXAMPLE 2

A specific process of encoding the two-dimensional planar image is as follows:

401. An encoder side converts a spherical panorama image into a two-dimensional planar image.

The foregoing spherical panorama image above may be a 360-degree panorama video image, and the two-dimensional planar image may be a 2D longitude and latitude map or a two-dimensional planar image that is in a polyhedronal form and that is obtained by mapping the foregoing spherical panorama image to a polyhedron.

The two-dimensional planar image in a polyhedronal form may be obtained by first mapping a spherical panorama image to a polyhedron (for example, a regular hexahedron) and then unfolding the regular hexahedron.

402. The encoder side divides the two-dimensional planar image into a plurality of regions including an overlapping region.

The plurality of regions may be regions in any shape, for example, a square shape, a rectangular shape, a round shape, a rhomboic shape, or another irregular shape. In addition, some of the plurality of regions may have an overlapping region, or neighboring regions have an overlapping region. During region division, the encoder side may determine a region division manner, regions that have an overlapping region, and the like. Alternatively, the region division manner may be determined by the decoder side, and the encoder side determines the region division manner based on indication information sent by the decoder side.

After the two-dimensional planar image is divided into the plurality of regions, overlapping information may be generated. The overlapping information is used to indicate a position, a size, and the like of the overlapping region, and the encoder side may send the overlapping information to the decoder side when sending encoded data to the decoder side.

403. The encoder side encodes images of the plurality of regions.

Compression methods such as H.264 and H.265 may be used during encoding.

404. Obtain encoded data.

After obtaining the encoded data, the encoder side may transmit the encoded data to the decoder side, or store the encoded data in cloud or another storage apparatus.

EXAMPLE 3

The two-dimensional planar image processed according to the image processing method in this embodiment of this application may alternatively be a two-dimensional planar image obtained by mapping images of different surface regions in a spherical panorama image to a plane based on curvatures of the spherical panorama image (where for details of a mapping process, refer to the solution of the Patent Application No. 201610886263.6). Then, a boundary of a region in the two-dimensional planar image is expanded based on a preset viewport, so that the expanded region overlaps other neighboring regions, and an overlapping region is determined. The following describes a process of determining the overlapping region in detail with reference to FIG. 12:

501. Obtain a two-dimensional planar image obtained by mapping a spherical panorama image, divide the two-dimensional planar image into a plurality of subregions, determine a region E that should be expanded (where the region E herein is used as an example for description, and actually, there may be a plurality of regions in the two-dimensional planar image that should be expanded).

502. Determine a surface region E' corresponding to the region E in the spherical image.

503. Find a center point A of the surface region, and draw a line between A and a sphere center O. It may be considered that OA is a viewing line along which the spherical image is viewed and that is led from the point O. It is assumed that there is a predetermined viewport range, a horizontal viewport range is θ, and a vertical viewport range is φ. Based on the viewing line OA and the viewport range, an image region F' (a region obtained by mapping a dashed region in the left diagram of FIG. 12 to the spherical surface) that corresponds to the viewport range and that is on the spherical surface is obtained. Values of θ and φ should satisfy that the region F' should to cover the region E', in other words, the region F' includes the region E'.

Preferably, if the region F' includes the region E', θ and φ may be angles such as 30°, 45°, and 60° that is divisible by 360°.

504. Determine an overlapping region of the region E based on a region G and the region E, where the region G is a region that is in the left diagram of FIG. 12 and that corresponds to the region F'. Because the region G includes the region E, other regions in the region G than the region E may be used as the overlapping region.

505. Determine an overlapping region of sub-images of other regions in the two-dimensional image in a similar manner.

506. The encoder side encodes images of a plurality of regions.

507. Obtain encoded data.

Figure 13:
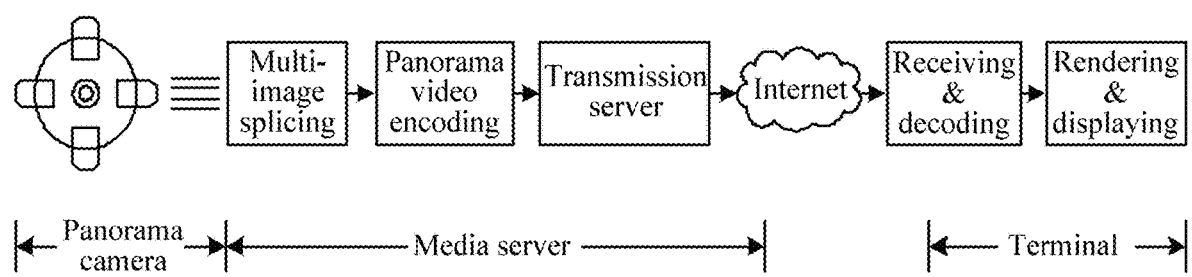
FIG. 13 is a schematic block diagram of a system architecture to which an image processing method is applied according to an embodiment of this application.

FIG. 13 is a schematic diagram of an architecture to which an image encoding method is applied according to an embodiment of this application. The architecture includes an entire process of encoding, decoding, and displaying. The architecture mainly includes:

A panorama camera: configured to collect images at 360 degrees and splice the collected images into a panorama image or a panorama video. Herein, the images may be spliced by the panorama camera or a media server.

A media server, configured to: perform operations such as encoding or transcoding the images collected or spliced by the panorama camera, and transmit the encoded data to a terminal by using a network. Herein, the media server may further select images that should be transmitted and quality of the images that should be transmitted, based on a user viewport fed back by the terminal. The media server herein may be a media source server, a transmission server, a transcoder server, or the like, and the media server may be located on a network side.

A terminal: the terminal herein may be an electronic device such as VR glasses, a mobile phone, a tablet computer, a television, or a computer that can be connected to a network.

It should be understood that, in this embodiment of this application, encoding and decoding processing performed on an image may be understood as processing performed on an image in a video. The video may be understood as an image sequence of images collected at different time points. The images processed according to the image processing method and the image processing method in the embodiments of this application may be a single image in a video or an image sequence that forms a video.

The foregoing describes the image processing methods in the embodiments of this application in detail with reference to FIG. 1 to FIG. 13, and the following describes image processing apparatuses in the embodiments of this application in detail with reference to FIG. 14 to FIG. 17.

It should be understood that, the image processing apparatuses described in FIG. 14 to FIG. 17 can implement the blocks or operations of the image processing methods described in FIG. 1 to FIG. 13. For brevity, a repeated description is properly omitted.

Figure 14:
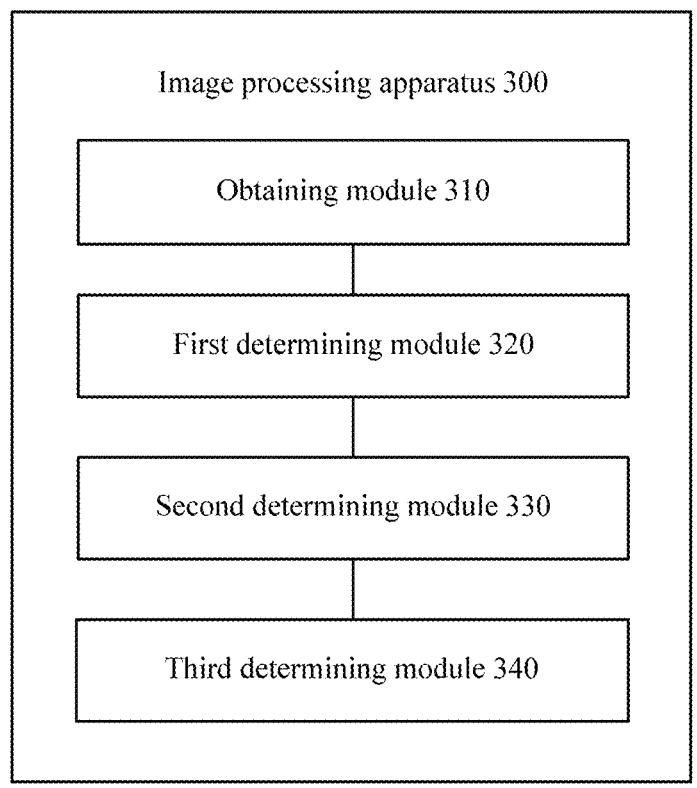
FIG. 14 is a schematic block diagram of an image processing apparatus according to an embodiment of this application.

FIG. 14 is a schematic block diagram of an image processing apparatus according to an embodiment of this application. The image processing apparatus 300 shown in FIG. 14 includes:

an obtaining module 310, configured to obtain encoded data of a first region and a neighboring region neighboring to the first region in a two-dimensional planar image, where the two-dimensional planar image is an image obtained by mapping a spherical panorama image, and the first region and the neighboring region have an overlapping region;

a first determining module 320, configured to determine a pixel value of a pixel in an image of the first region based on the encoded data of the image of the first region;

a second determining module 330, configured to determine a pixel value of a pixel in an image of the neighboring region based on the encoded data of the image of the neighboring region; and a third determining module 340, configured to determine a target pixel value of a pixel in the overlapping region based on the pixel value of the pixel of the first region in the overlapping region and the pixel value of the pixel of the neighboring region in the overlapping region.

In this embodiment of this application, a final pixel value of an overlapping region is determined based on pixel values of pixels of different regions in the overlapping region, so that the pixel values relatively slowly change when neighboring regions transit to each other, thereby improving a displaying effect achieved when images corresponding to the neighboring regions are switched, and improving user experience.

Optionally, in an embodiment, the image processing apparatus further includes:

a sending module 350, configured to: before the encoded data of the plurality of regions in the two-dimensional planar image is obtained, send first indication information to an encoder side, where the first indication information is used to indicate that the first region and the neighboring region that are obtained when the encoder side divides the two-dimensional planar image into regions have the overlapping region.

Optionally, in an embodiment, the first indication information is further used to indicate a size of the overlapping region and a position of the overlapping region relative to the first region.

Optionally, in an embodiment, the image processing apparatus further includes:

a receiving module 360, configured to receive second indication information from an encoder side, where the second indication information is used to indicate that the first region and the neighboring region have the overlapping region.

Optionally, in an embodiment, the third determining module 340 is configured to:

perform weighted processing on the pixel value of the pixel of the first region in the overlapping region and the pixel value of the pixel of the neighboring region in the overlapping region, to obtain the target pixel value of the pixel in the overlapping region.

Optionally, in an embodiment, the third determining module 340 is configured to: when a first difference is less than a first preset threshold, determine the pixel value of the pixel of the first region or the neighboring region in the overlapping region as the target pixel value, where the first difference is a difference between a resolution of the image of the first region and a resolution of the image of the neighboring region or a difference between a bitrate of the encoded data of the first region and a bitrate of the encoded data of the neighboring region.

Optionally, in an embodiment, the overlapping region is located between the first region and the neighboring region, and the first region is located in a horizontal direction of the neighboring region, or the first region is located in a vertical direction of the neighboring region.

Optionally, in an embodiment, the size of the overlapping region is determined based on a size of the two-dimensional planar image.

Optionally, in an embodiment, the size of the overlapping region is determined based on a size of the first region or the neighboring region.

Optionally, in an embodiment, the two-dimensional planar image further includes a second region; the first region is located in the second region; the overlapping region is a region in the second region other than the first region; the second region is a region that is in the two-dimensional planar image and to which an image of a third region in the spherical panorama image is mapped; and the third region is a region that is in the spherical panorama image and in which an image corresponding to a first viewport range is located.

Optionally, in an embodiment, the first viewport range is an angle value, and the angle value is a divisor of 360 degrees.

Figure 15:
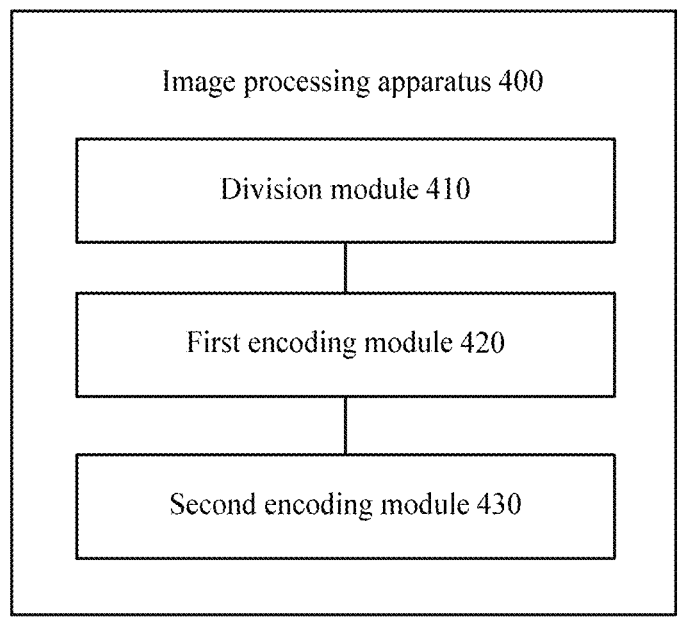
FIG. 15 is a schematic block diagram of an image processing apparatus according to an embodiment of this application.

FIG. 15 is a schematic block diagram of an image processing apparatus according to an embodiment of this application. The image processing apparatus 400 shown in FIG. 15 includes:

a division module 410, configured to divide a two-dimensional planar image into a plurality of regions, where the plurality of regions include a first region and a neighboring region neighboring to the first region, the first region and the neighboring region have an overlapping region, and the two-dimensional planar image is an image obtained by mapping a spherical panorama image;

a first encoding module 420, configured to encode an image of the first region to obtain encoded data of the first region; and a second encoding module 430, configured to encode an image of the neighboring region to obtain encoded data of the first region.

In this embodiment of this application, during region division, the two-dimensional planar image is divided into images of which neighboring regions have an overlapping region. Compared with the prior art that regions obtained through division have no overlapping region, a decoder side can determine a final pixel value of the overlapping region based on pixel values of pixels of the neighboring regions in the overlapping region, so that the pixel values relatively slowly change when the neighboring regions transit to each other, thereby improving a displaying effect achieved when images corresponding to the neighboring regions are switched, and improving user experience.

Optionally, in an embodiment, the image processing apparatus further includes:

a receiving module 440, configured to receive first indication information from a decoder side, where the first indication information is used to indicate that the first region and the neighboring region that are obtained when the two-dimensional planar image is divided into regions have the overlapping region.

Optionally, in an embodiment, the first indication information is further used to indicate a size of the overlapping region and a position of the overlapping region relative to the first region.

Optionally, in an embodiment, the image processing apparatus further includes:

a sending module 450, configured to send second indication information to the decoder side, where the second indication information is used to indicate that the first region and the neighboring region have the overlapping region.

Optionally, in an embodiment, the overlapping region is located between the first region and the neighboring region, and the first region is located in a horizontal direction of the neighboring region, or the first region is located in a vertical direction of the neighboring region.

Optionally, in an embodiment, the size of the overlapping region is determined based on a size of the two-dimensional planar image.

Optionally, in an embodiment, the size of the overlapping region is determined based on a size of the first region or the neighboring region.

Optionally, in an embodiment, the two-dimensional planar image further includes a second region; the first region is located in the second region; the overlapping region is a region in the second region other than the first region; the second region is a region that is in the two-dimensional planar image and to which an image of a third region in the spherical panorama image is mapped; and the third region is a region that is in the spherical panorama image and in which an image corresponding to a first viewport range is located.

Optionally, in an embodiment, the first viewport range is an angle value, and the angle value is a divisor of 360 degrees.

Figure 16:
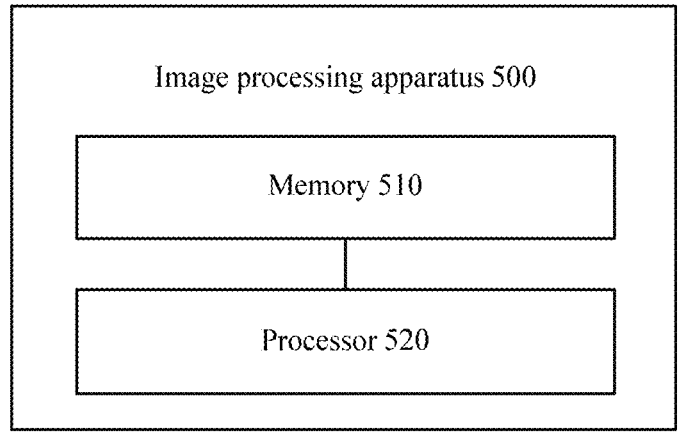
FIG. 16 is a schematic block diagram of an image processing apparatus according to an embodiment of this application.

FIG. 16 is a schematic block diagram of an image processing apparatus according to an embodiment of this application. The image processing apparatus 500 shown in FIG. 16 includes:

a memory 510, configured to store a program;

a processor 520, configured to execute a program stored in the memory 510, where when the program is executed, the processor 520 is configured to:

obtain encoded data of a first region and a neighboring region neighboring to the first region in a two-dimensional planar image, where the two-dimensional planar image is an image obtained by mapping a spherical panorama image, and the first region and the neighboring region have an overlapping region;

determine a pixel value of a pixel in an image of the first region based on the encoded data of the image of the first region;

determine a pixel value of a pixel in an image of the neighboring region based on the encoded data of the image of the neighboring region; and determine a target pixel value of a pixel in the overlapping region based on the pixel value of the pixel of the first region in the overlapping region and the pixel value of the pixel of the neighboring region in the overlapping region.

In this embodiment of this application, a final pixel value of an overlapping region is determined based on pixel values of pixels of different regions in the overlapping region, so that the pixel values relatively slowly change when neighboring regions transit to each other, thereby improving a displaying effect achieved when images corresponding to the neighboring regions are switched, and improving user experience.

Optionally, in an embodiment, the image processing apparatus 500 further includes:

a transceiver 530, configured to: before the encoded data of the plurality of regions in the two-dimensional planar image is obtained, send first indication information to an encoder side, where the first indication information is used to indicate that the first region and the neighboring region that are obtained when the encoder side divides the two-dimensional planar image into regions have the overlapping region.

Optionally, in an embodiment, the first indication information is further used to indicate a size of the overlapping region and a position of the overlapping region relative to the first region.

Optionally, in an embodiment, the transceiver 530 is configured to receive second indication information from an encoder side, where the second indication information is used to indicate that the first region and the neighboring region have the overlapping region.

Optionally, in an embodiment, the processor 520 is configured to: perform weighted processing on the pixel value of the pixel of the first region in the overlapping region and the pixel value of the pixel of the neighboring region in the overlapping region, to obtain the target pixel value of the pixel in the overlapping region.

Optionally, in an embodiment, when a first difference is less than a first preset threshold, the pixel value of the pixel of the first region or the neighboring region in the overlapping region is determined as the target pixel value, where the first difference is a difference between a resolution of the image of the first region and a resolution of the image of the neighboring region or a difference between a bitrate of the encoded data of the first region and a bitrate of the encoded data of the neighboring region.

Optionally, in an embodiment, the size of the overlapping region is determined based on a size of the two-dimensional planar image.

Optionally, in an embodiment, the size of the overlapping region is determined based on a size of the first region or the neighboring region.

Optionally, in an embodiment, the two-dimensional planar image further includes a second region; the first region is located in the second region; the overlapping region is a region in the second region other than the first region; the second region is a region that is in the two-dimensional planar image and to which an image of a third region in the spherical panorama image is mapped; and the third region is a region that is in the spherical panorama image and in which an image corresponding to a first viewport range is located.

Optionally, in an embodiment, the first viewport range is an angle value, and the angle value is a divisor of 360 degrees.

Figure 17:
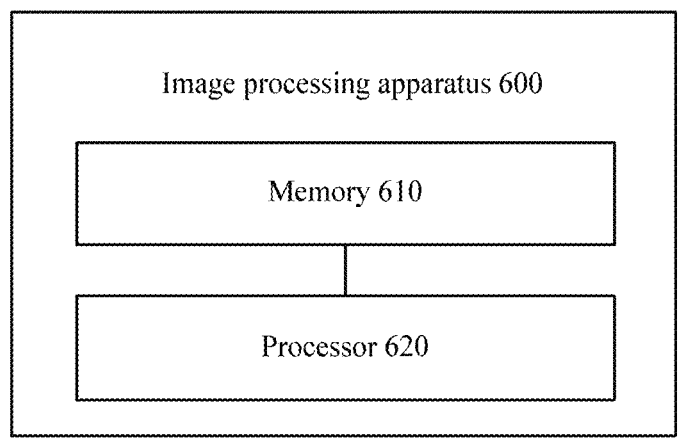
FIG. 17 is a schematic block diagram of an image processing apparatus according to an embodiment of this application.

FIG. 17 is a schematic block diagram of an image processing apparatus according to an embodiment of this application. The image processing apparatus 600 shown in FIG. 17 includes:

a memory 610, configured to store a program;

a processor 620, configured to execute a program stored in the memory 610, and when the program is executed, the processor 620 is configured to:

divide a two-dimensional planar image into a plurality of regions, where the plurality of regions include a first region and a neighboring region neighboring to the first region, the first region and the neighboring region have an overlapping region, and the two-dimensional planar image is an image obtained by mapping a spherical panorama image;

encode an image of the first region to obtain encoded data of the first region; and encode an image of the neighboring region to obtain encoded data of the first region.

In this embodiment of this application, during region division, the two-dimensional planar image is divided into images of which neighboring regions have an overlapping region. Compared with the prior art that regions obtained through division have no overlapping region, a decoder side can determine a final pixel value of the overlapping region based on pixel values of pixels of the neighboring regions in the overlapping region, so that the pixel values relatively slowly change when the neighboring regions transit to each other, thereby improving a displaying effect achieved when images corresponding to the neighboring regions are switched, and improving user experience.

Optionally, in an embodiment, the image processing apparatus 600 further includes:

a transceiver 630, configured to: before the encoded data of the plurality of regions in the two-dimensional planar image is obtained, send first indication information to an encoder side, where the first indication information is used to indicate that the first region and the neighboring region that are obtained when the encoder side divides the two-dimensional planar image into regions have the overlapping region.

Optionally, in an embodiment, the first indication information is further used to indicate a size of the overlapping region and a position of the overlapping region relative to the first region.

Optionally, in an embodiment, the transceiver 630 is configured to receive second indication information from an encoder side, where the second indication information is used to indicate that the first region and the neighboring region have the overlapping region.

Optionally, in an embodiment, the processor 620 is configured to: perform weighted processing on the pixel value of the pixel of the first region in the overlapping region and the pixel value of the pixel of the neighboring region in the overlapping region, to obtain the target pixel value of the pixel in the overlapping region.

Optionally, in an embodiment, the processor 620 is configured to: when a first difference is less than a first preset threshold, determine the pixel value of the pixel of the first region or the neighboring region in the overlapping region as the target pixel value, where the first difference is a difference between a resolution of the image of the first region and a resolution of the image of the neighboring region or a difference between a bitrate of the encoded data of the first region and a bitrate of the encoded data of the neighboring region.

Optionally, in an embodiment, the overlapping region is located between the first region and the neighboring region, and the first region is located in a horizontal direction of the neighboring region, or the first region is located in a vertical direction of the neighboring region.

Optionally, in an embodiment, the size of the overlapping region is determined based on a size of the two-dimensional planar image.

Optionally, in an embodiment, the size of the overlapping region is determined based on a size of the first region or the neighboring region.

Optionally, in an embodiment, the two-dimensional planar image further includes a second region; the first region is located in the second region; the overlapping region is a region in the second region other than the first region; the second region is a region that is in the two-dimensional planar image and to which an image of a third region in the spherical panorama image is mapped; and the third region is a region that is in the spherical panorama image and in which an image corresponding to a first viewport range is located.

Optionally, in an embodiment, the first viewport range is an angle value, and the angle value is a divisor of 360 degrees.

The technologies in this application may be widely implemented by a plurality of types of apparatuses or devices. The apparatuses or devices include a radio handset, an integrated circuit (IC), or an IC set (for example, a chip set). In this application, various components, modules, and units are described to emphasize functions of an apparatus that is configured to implement the disclosed technologies, and the functions do not necessarily need to be implemented by different hardware units. Precisely, as described in the foregoing, various units may be combined into a coder-decoder hardware unit, or may be provided by a set of interoperable hardware units (including one or more processors described in the foregoing) and appropriate software and/or firmware.

It should be understood that "an implementation" or "one implementation" mentioned in the whole specification does not mean that particular features, structures, or characteristics related to the implementation are included in at least one implementation of this application. Therefore, "in an implementation" or "in one implementation" appearing throughout the specification does not refer to a same implementation. In addition, these particular features, structures, or characteristics may be combined in one or more implementations in any appropriate manner.

It should be understood that sequence numbers of the foregoing processes do not mean execution sequences in various implementations of this application. The execution sequences of the processes should be determined according to functions and internal logic of the processes, and should not be construed as any limitation on the implementation processes of the implementations of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the implementations of this application, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm blocks or operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the blocks or operations of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image processing method, comprising:
   sending, by a decoder, first indication information to an encoder that divides a two-dimensional planar image mapped from a spherical panorama image into a plurality of regions, wherein the first indication information indicates that a first region of the plurality of regions and a second region of the plurality of regions have an overlapping region, wherein the first region and the second region are neighboring regions;
   obtaining, by the decoder, encoded data of the first region and encoded data of the second region;
   determining, by the decoder, first pixel values of pixels in a first image of the first region based on the encoded data of the first region, the first image of the first region representing a part of the first region corresponding to the overlapping region;
   determining, by the decoder, second pixel values of pixels in a second image of the second region based on the encoded data of the second region, the second image representing a part of the second region corresponding to the overlapping region-; and
   determining, by the decoder, a target pixel value of each pixel in the overlapping region based on a first pixel value of a corresponding pixel in the first image of the first region and a second pixel value of the corresponding pixel in the second image of the neighboring second region.

2. The method according to claim 1, wherein the first indication information further indicates a size of the overlapping region and a position of the overlapping region relative to the first region.

3. The method according to claim 1, wherein the method further comprises:
   receiving, by the decoder, second indication information from the encoder, wherein the second indication information indicates that the first region and the second region have the overlapping region.

4. The method according to claim 1, wherein the determining the target pixel value of each pixel in the overlapping region comprises:
performing weighted processing on the first pixel value of the corresponding pixel in the first region and the second pixel value of the corresponding pixel in the second region-, to obtain the target pixel value of the corresponding pixel.

5. The method according to claim 1, wherein the determining the target pixel value of each pixel in the overlapping region comprises:
when a first difference is less than a first preset threshold, determining the first pixel value or the second pixel value as the target pixel value, wherein the first difference is a difference between a first resolution of the first image of the first region and a second resolution of the second image of the second region or a difference between a first bitrate of the encoded data of the first region and a second bitrate of the encoded data of the second region.

6. The method according to claim 1, wherein the overlapping region is located between the first region and the second region and wherein the first region is located in a horizontal direction of the second region, or the first region is located in a vertical direction of the second region.

7. The method according to claim 1, wherein a size of the overlapping region is determined based on a size of the two-dimensional planar image.

8. The method according to claim 1, wherein a size of the overlapping region is determined based on a size of the first region or the second region.

9. An image processing apparatus, comprising:
a processor;
a memory coupled to the processor, wherein the memory stores program instructions, which, when executed, cause the imaging processing apparatus to perform operations comprising:
sending, by a decoder, first indication information to an encoder that divides a two-dimensional planar image mapped from a spherical panorama image into a plurality of regions, wherein the first indication information indicates that a first region of the plurality of regions and a second region of the plurality of regions have an overlapping region, wherein the first region and the second region are neighboring regions;
obtaining, by the decoder, encoded data of the first region and encoded data of the second region;
determining first pixel values of pixels in a first image of the first region based on the encoded data of the first region, the first image of the first region representing a part of the first region corresponding to the overlapping region;

determining second pixel values of pixels in a second image of the second region based on the encoded data of the second region, the second image representing a part of the second region corresponding to the overlapping region; and
determining a target pixel value of each pixel in the overlapping region based on a first pixel value of a corresponding pixel in the first image of the first region and a second pixel value of the corresponding pixel in the second image of the second region.

10. The image processing apparatus according to claim 9, wherein the first indication information further indicates a size of the overlapping region and a position of the overlapping region relative to the first region.

11. The image processing apparatus according to claim 9, the operations further comprising:
receiving second indication information from the encoder, wherein the second indication information indicates that the first region and the second region have the overlapping region.

12. The image processing apparatus according to claim 9, the operations further comprising;
performing weighted processing on the first pixel value of the corresponding pixel in the first region and the second pixel value of the corresponding pixel in the second region, to obtain the target pixel value of the corresponding pixel.

13. The image processing apparatus according to claim 9, the operations further comprising:
when a first difference is less than a first preset threshold, determining the first pixel value or the second pixel value as the target pixel value, wherein the first difference is a difference between a first resolution of the first image of the first region and a second resolution of the second image of the second region or a difference between a first bitrate of the encoded data of the first region and a second bitrate of the encoded data of the second region.

14. The image processing apparatus according to claim 9, wherein the overlapping region is located between the first region and the second region and wherein the first region is located in a horizontal direction of the second region, or the first region is located in a vertical direction of the second region.

15. The image processing apparatus according to claim 9, wherein a size of the overlapping region is determined based on a size of the two-dimensional planar image.

16. The image processing apparatus according to claim 9, wherein a size of the overlapping region is determined based on a size of the first region or the second region.

* * * * *